United States Patent
Graf

(10) Patent No.: US 6,317,798 B1
(45) Date of Patent: Nov. 13, 2001

(54) REMOTE INITIATION OF BIOS CONSOLE REDIRECTION

(75) Inventor: John D. Graf, San Jose, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/248,663

(22) Filed: Feb. 11, 1999

(51) Int. Cl.$^7$ .................................................. G06F 15/16
(52) U.S. Cl. .......................... 710/15; 709/219; 714/46; 714/57
(58) Field of Search .................... 710/14, 15–19, 710/264, 38; 713/310, 2, 201, 100; 709/224, 222, 221, 217–219; 345/355; 714/46, 57

(56) References Cited

U.S. PATENT DOCUMENTS

| | | | |
|---|---|---|---|
| 3,889,062 | * 6/1975 | Epstein | 379/100.01 |
| 4,377,852 | * 3/1983 | Thompson | 710/47 |
| 4,949,248 | * 8/1990 | Caro | 709/203 |
| 5,062,059 | * 10/1991 | Youngblood et al. | 709/217 |
| 5,276,863 | * 1/1994 | Heider | 709/222 |
| 5,349,675 | 9/1994 | Fitzgerald et al. | 395/800 |
| 5,455,933 | * 10/1995 | Schieve et al. | 714/27 |
| 5,577,210 | 11/1996 | Abdous et al. | 395/200.1 |
| 5,583,793 | * 12/1996 | Gray et al. | 709/223 |
| 5,615,331 | * 3/1997 | Toorians et al. | 714/9 |
| 5,687,096 | * 11/1997 | Lappen et al. | 345/2 |
| 5,721,842 | * 2/1998 | Beasley et al. | 710/131 |
| 5,732,212 | 3/1998 | Perholtz | 395/200.11 |
| 5,790,895 | * 8/1998 | Krontz et al. | 710/64 |
| 5,857,074 | * 1/1999 | Johnson | 709/217 |
| 5,884,096 | 3/1999 | Beasley et al. | 395/858 |
| 5,933,614 | * 8/1999 | Tavallaei et al. | 710/129 |
| 5,937,176 | * 8/1999 | Beasley et al. | 345/113 |
| 6,098,143 | * 8/2000 | Humpherys et al. | 710/260 |

OTHER PUBLICATIONS

Intel Architecture Software Developers Manual, "System Programmer's Guide", vol. III Chapter 11: *System Management Mode (SMM)*, pp. 11–1 to 11–16 (1997).

Phoenix Technologies Ltd., "Phoenix Server BIOS™: Serial Remote Console", pp. 1–2 (1998) [on–line]Available http://www.phoenix.com/products/serverbios.html.

* cited by examiner

*Primary Examiner*—Sumati Lefkowitz

(57) ABSTRACT

A server management tool which allows remote initialization of BIOS console redirection on a computer system (e.g., server computer). Server computer is coupled to a remote console via an asynchronous connection. Console redirection is initiated by generating a serial break on the asynchronous connection via the remote console. The server computer detects the serial break by a break detect circuit. The break detect circuit then generates a signal which places the CPU of the server computer into system management mode (SMM). After server computer CPU is in SMM, a password and console redirection request are passed to the server computer from the remote console via the asynchronous connection. After the password sent by the remote console has been authenticated by an SMI handler routine within the server computer, the SMM of the CPU processes the redirection request by calling the basic input output system (BIOS) and the SMI handler routine. The serial break within the server computer is cleared after processing the console redirection request.

26 Claims, 4 Drawing Sheets

REMOTE INITIATION OF BIOS CONSOLE REDIRECTION

THE FIELD OF THE INVENTION

The present invention relates to remote server management tools in a distributed computing environment, and, more particularly to a method and apparatus to remotely initiate BIOS console redirection on a server computer.

BACKGROUND OF THE INVENTION

Today, distributed computing environments are assuming an increasingly important role in the data processing activities of many organizations. A typical distributed computing environment often includes a plurality of widely dispersed server computers residing in remote locations. These server computers perform data management and other functions for one or more client computers which are attached to each server computer via a computer network. In the past, when a problem occurred with a server computer, an administrator would have to be physically dispatched to the remote server computer location in order to resolve the problem. However, such "boffice visits" were a costly, highly inefficient way of doing business.

As a result, several remote management tools were developed to enable administrators to manage server computers in remote locations via a computer network. Such tools allow administrators and technicians to diagnose and solve problems with remote server computers from a single, centralized server management console.

One type of tool employed in remote server management is PC Basic Input Output System (BIOS) console redirection. The BIOS is responsible for booting the computer by providing a basic set of instructions. It performs all of the tasks that need to be done at start-up time, such as Power-On Self Test (POST), and booting an operating system from a floppy disk drive (FDD) or a hard disk drive (HDD). Furthermore, the BIOS provides an interface to the underlying hardware for the operating system in the form of a library of interrupt handlers. For instance, each time a key is pressed, the Central Processing Unit (CPU) performs an interrupt to read that key. In a similar manner, interrupt handlers also provide an interface to serial and parallel ports, video cards, sound cards, hard disk controllers, and other peripheral devices.

The features of the BIOS permit input/output operations within a remote server to be redirected to a centralized server management console in another location. PC BIOS console redirection tools have been available from Phoenix and other BIOS vendors for several years. These tools provide a method to troubleshoot system boot problems from a remote location using an interface that is like being in front of the system console.

Unfortunately, prior art PC BIOS console redirection tools required someone local to the remote server to enable the console redirection feature using a BIOS setup utility. Often, the remote servers run unattended in physically remote locations, wherein it is often difficult to find a person capable of enabling the console redirection feature. Alternatively, the console redirection feature could be permanently enabled at the remote server. However, permanent enablement of the console redirection feature poses a security threat, since the console redirection feature is not password-protected.

Also, many of the prior art PC BIOS console redirection tools have also required a relatively expensive, dedicated microcontroller to assist in the redirection function. The addition of a dedicated microcontroller to the remote server to perform the console redirection is often prohibitively expensive, especially in low-cost servers.

In view of the above, there is a need for an apparatus and method for remotely initiating BIOS console redirection on a server computer. Furthermore, the apparatus and method for remotely initiating BIOS console redirection preferably does not require a relatively expensive, dedicated microcontroller in order to accomplish its task.

SUMMARY OF THE INVENTION

The present invention provides a computer system communicating with a remote console via an asynchronous connection, where the remote console generates a serial break on the asynchronous connection. The computer system includes a register having a first bit and a second bit, and a break detect circuit coupled to the register for detecting the serial break generated by the remote console and activating a break detect signal in response to the detection. The first bit of the register is set in response to activation of the break detect signal. The break detect signal is de-activated in response to a second bit of the register being set. The computer system also includes a system management interrupt (SMI) circuit for asserting an SMI signal upon detection of the break detect signal. The computer system further includes a memory for storing a basic input output system (BIOS) and an SMI handler routine. Finally, the computer system includes a central processing unit (CPU) coupled to the SMI circuit, the register and the memory. The CPU is responsive to the SMI signal being asserted by the SMI circuit, and identifies the SMI signal assertion as a remote break by reading the first bit of the register. The CPU next processes a subsequent redirection request generated by the remote console by calling the BIOS and the SMI handler routine. Finally, the CPU sets the second bit of the register upon completion of the processing of the redirection request.

In one embodiment of the present invention, the computer system further includes a serial port coupled to the asynchronous connection, such as an RS-232 serial port. The computer system can also include a modem coupled to the serial port. In one embodiment, the computer system includes a software application which is configured to answer an incoming call from the remote console via the modem. Examples of software applications which can answer the incoming call include: Windows NT Remote Access Server (RAS), and PC-Anywhere 32. Alternatively, the modem can be set to an auto-answer mode to handle the incoming call.

In one embodiment of the present invention, the computer system further includes a universal asynchronous receiver-transmitter (UART) coupled to the serial port which manages the serial port and handles communication across the asynchronous connection. In another embodiment of the present invention, the SMI circuit of the present invention comprises a multiplexer, where the output of the multiplexer switches from an IRQ signal to the SMI signal upon detection of the break detect signal.

The computer system includes a CMOS memory chip having an authorization password for controlling remote access to the BIOS of the computer system from the remote console, in one embodiment of the present invention. In this embodiment, a user password entered at the remote console is passed to the computer system. The entered user password is then validated against the authorization password prior to processing the console redirection request.

The present invention also provides a method for enabling remote initiation of basic input output system (BIOS) console redirection on a computer system via an asynchronous connection. The method begins by generating a serial break on the asynchronous connection of the computer system. Next, the computer system detects and processes the serial break, such that the central processing unit (CPU) is placed in system management mode (SMM) upon detection of the serial break. After the CPU is placed in SMM mode, a console redirection request is generated on the asynchronous connection of the computer system. Next the CPU processes the console redirection request such that the SMM of the CPU calls the BIOS and an SMI handler routine to service the console redirection request. Upon completion of processing the console redirection request, the serial break is cleared on the computer system.

In one embodiment of the present invention, the method of processing of the console redirection request at the CPU further includes transmitting a carriage return from the remote console to the CPU, such that the carriage return generates an SMI password initialization request which is processed by an SMI handler routine. Next, a password prompt is sent from the SMI handler routine to the remote console. The remote console next transmits a password to the CPU, and the CPU verifies the transmitted password with the SMI handler routine. The SMI handler routine receives each transmitted character of the password and compares each transmitted character of the password with a corresponding character of a stored password until a carriage return is received. If the password is successfully verified, the SMI handler routine sends a second prompt to the remote console describing a set of options for console redirection. However, upon three consecutive password verification failures, the SMI handler routine deactivates the break detect signal by setting the second bit of the register.

User selectable options for console redirection include: a first option to reset the computer system and enable BIOS console redirection; a second option to power cycle the server and enable the BIOS console redirection; and a third option to power off the server.

The present invention provides a second method for enabling remote initiation of BIOS console redirection on a computer system via an asynchronous connection. The second method begins by generating a serial break on the asynchronous connection. The computer system then detects the serial break via a break detect circuit, where the break detect circuit activates a break detect signal in response to the detection. Next, a first bit of a register coupled to the break detect circuit is set upon activation of the break detect signal, and an system management interrupt (SMI) signal is asserted via an SMI circuit upon detection of the break detect signal. The CPU next identifies the asserted SMI signal as a remote break by reading the first bit of the register, and upon identification of the SMI signal as a remote break, the CPU is subsequently placed in system management mode (SMM). Next a console redirection request is generated on the asynchronous connection, and the console redirection request is processed at the CPU. The CPU processes the redirection request by calling the BIOS and an SMI handler routine to service the console redirection request. Finally, the serial break within the computer system is cleared upon the completion of processing of the console redirection request by setting a second bit of the register.

The present invention provides a method and apparatus to remotely initiate BIOS console redirection on a server computer. Unlike prior art BIOS console redirection tools, the present invention does not require a relatively expensive, dedicated microcontroller to assist in the redirection function. Instead, the present invention utilizes a simple serial break detect circuit, the system management mode of the central processing unit and a system management interrupt routine to service the console redirection request. While prior art BIOS console redirection tools required someone local to the computer system server to enable the console redirection feature, the present invention allows remote initiation of the console redirection feature at a remote console, without any user intervention at the computer system server.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
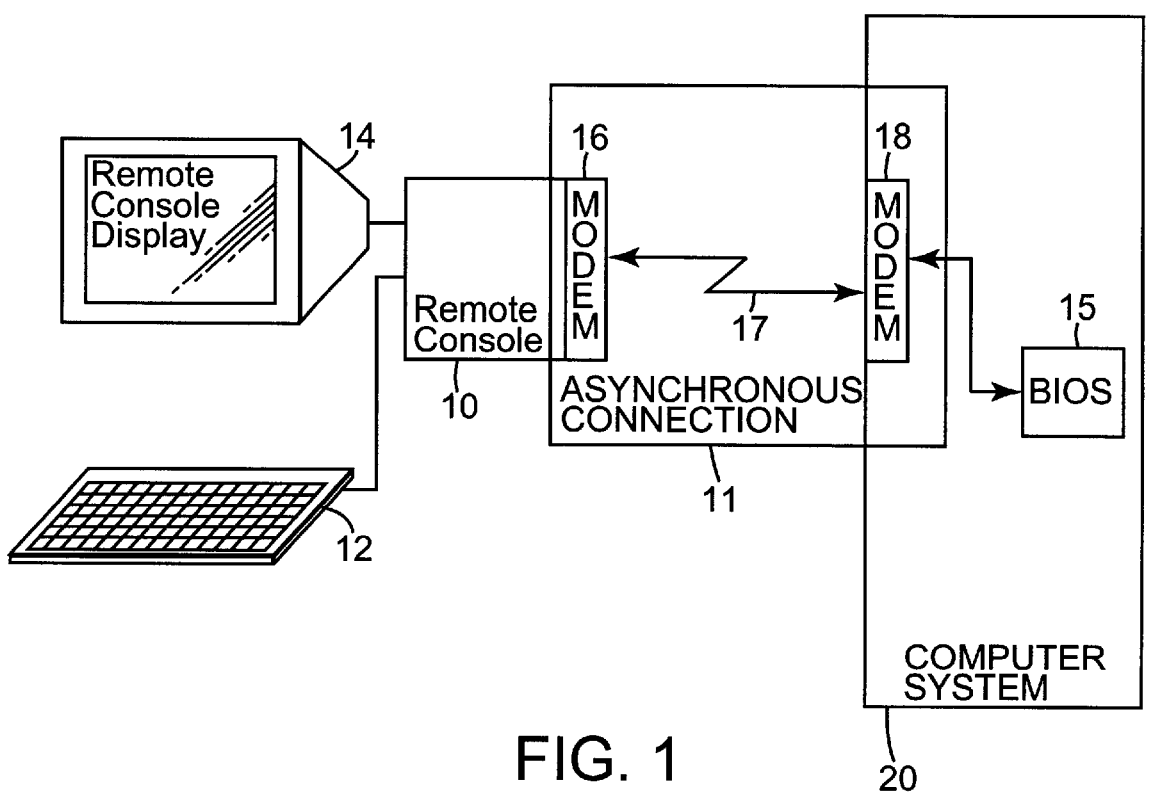
FIG. 1 illustrates a distributed computing environment in which a remote console initiates BIOS console redirection on a computer system in accordance with the present invention.

FIG. 1 illustrates a distributed computing environment in which a remote console 10 initiates BIOS console redirection on a computer system 20. The distributed computing environment includes remote console 10 which initiates the redirection request via an input device 12 and displays the results of the redirection request on an output device 14. Examples of input devices 12 include, but are not limited to: a keyboard; a mouse; an electronic tablet; a touchpad; and microphone. In a preferred embodiment of the present invention, input device 12 is a keyboard. Potential output devices 14 include, but are not limited to: a video display; a printer; and a storage medium such as a floppy disk, a hard disk, or a removable cartridge disk. In a preferred embodiment of the present invention, output device 14 is a video display.

Remote console 10 is connected to computer system 20 via an asynchronous connection 11. In a preferred embodiment of the present invention, asynchronous connection 11 includes a first modem 16 coupled to remote console 10, a second modem 18 coupled to computer system 20, and a phone line 17 coupling modem 16 to modem 18. In an alternate embodiment, remote console 10 is coupled to computer system 20 via a direct serial connection.

In one embodiment, computer system 20 is a server computer, but computer system 20 can be any suitable computer system where BIOS remote console redirection is desired. Server computer 20 includes a basic input output system (BIOS) 15. BIOS 15 contains all of the code required to control the keyboard, display screen, disk drives, serial communications, and a number of miscellaneous functions. In the present invention, BIOS 15 is stored in a memory chip, such as a read only memory (ROM) or a non-volatile memory, to ensure that the BIOS is always available and is isolated from disk failures. Computer system 20 can employ BIOS 15 to self boot.

In one embodiment, a user at remote console 10 initiates BIOS console redirection on computer system 20 by generating a keystroke or sequence of keystrokes at keyboard input device 12. Remote console 10 converts the keystroke sequence into a sequence of scan codes and sends the sequence of scan codes to computer system 20 via asynchronous connection 11. If computer system 20 detects an appropriate scan code for a serial break operation, computer system 20 generates a system management interrupt (SMI) signal to initiate system management mode (SMM) in computer system 20. After computer system 20 enters SMM mode, an SMI handler routine within computer system 20 generates a password prompt and sends the password prompt to remote console 10 via asynchronous connection 11. The password prompt is displayed at video display output device 14 on remote console 10.

Upon receipt of the password prompt, the user at remote console 10 enters a password via keyboard input device 12 to enable the redirection feature on computer system 20. The user terminates entry of the password by entering a carriage return at keyboard input device 12. The entered password is next converted to a sequence of scan codes and sent to computer system 20 from remote console 10 via asynchronous connection 11. Since computer system 20 is now in SMM mode, the transmitted password is verified against a stored password on computer system 20 by the SMI handler routine. If the password is successfully verified by the SMI handler routine, a second prompt is transmitted from computer system 20 to remote console 10 via asynchronous connection 11. This second prompt is displayed at video display output device 14, and presents the user at remote console 10 with multiple options for console redirection. The user next selects one of the console redirection options by entering the chosen option via keyboard input device 12. The chosen console redirection option is transmitted to computer system 20 via asynchronous connection 11, where the BIOS 15 is properly configured for the chosen console redirection option.

Figure 2:
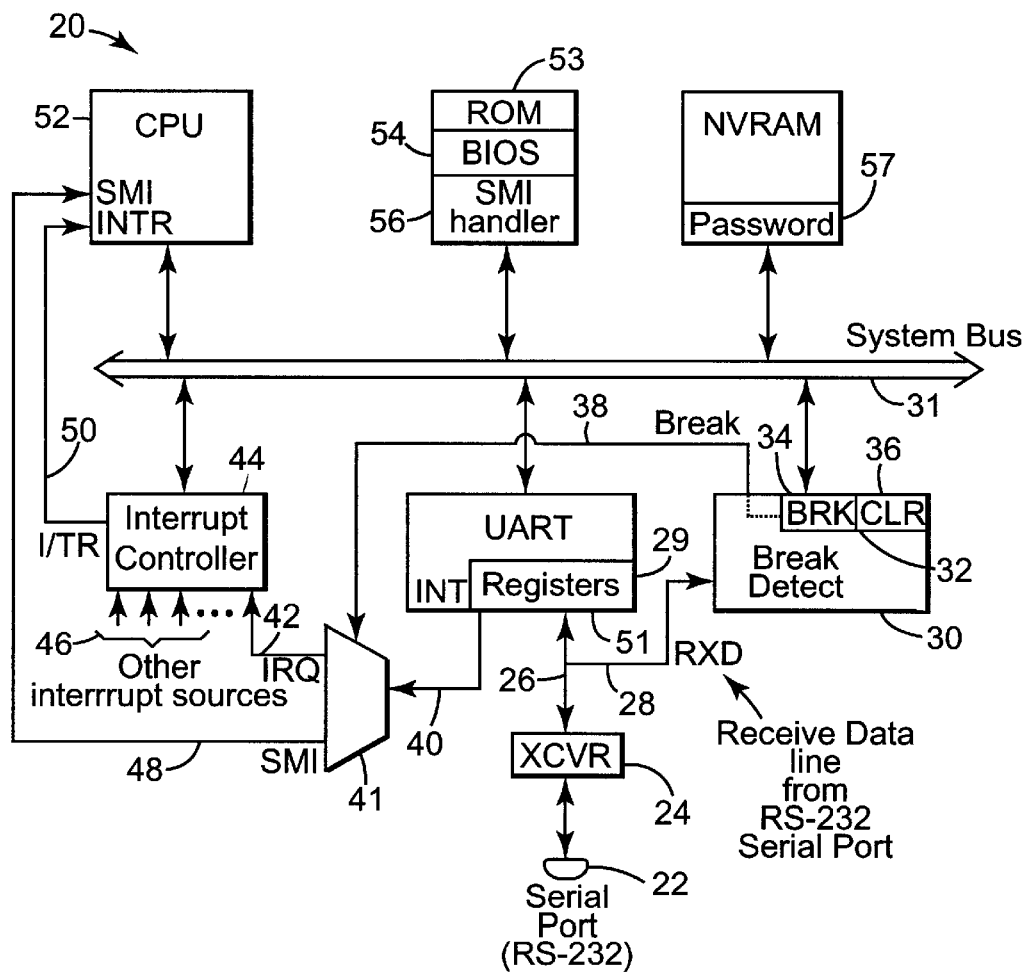
FIG. 2 is a generalized block diagram of a server computer which supports BIOS console redirection in accordance with the present invention.

FIG. 2 is a generalized block diagram of one embodiment of computer system 20, wherein computer system 20 is a server computer which supports BIOS console redirection in accordance with the present invention. Server computer 20 includes a serial port 22 for communicating with external devices and computers. In a preferred embodiment, serial port 22 is an RS-232 type serial port. Server computer 20 also includes a transceiver 24 coupled to serial port 22 which aids in the transmission and receipt of serial data. A universal asynchronous receiver-transmitter (UART) 29 is coupled to the transceiver 24 to handle asynchronous serial communication. Server computer 20 utilizes UART 29 to manage its serial ports. In a preferred embodiment, UART 29 is a 16550 UART, which contains a 16-byte buffer, enabling it to support higher transmission rates than a conventional 8250 UART. UART 29 is coupled to a system bus 31. UART 29 generates an UART interrupt signal 40 which is transmitted to interrupt controller 44 upon receipt of data by transceiver 24. UART 29 includes registers 51 for storing status and control bits.

A break detect is coupled to transceiver 24 via a receive data line 28. Break detect circuit 30 includes discrete logic for detecting serial breaks generated by remote console 10 (shown in FIG. 1), and activating a break detect signal 38 in response to the detection. Break detect circuit 30 further includes a register 32 having a break bit 34 and a clear bit 36. Break bit 34 of register 32 is set in response to activation of the break detect signal 38. Clear bit 36 of register 32 is set upon completion of the BIOS console redirection function. After clear bit 36 is set, break detect signal 38 is subsequently de-activated. Both break bit 34 and clear bit 36 of register 32 are coupled to system bus 31.

Server computer 20 also includes a system management interrupt (SMI) circuit 41 which asserts an SMI signal 48 upon detection of break detect signal 38 and UART interrupt signal 40. In a preferred embodiment, SMI circuit 41 is a multiplexer, which switches from asserting an interrupt request line (IRQ) signal 42 to asserting SMI signal 48 upon detection of break detect signal 38 and interrupt signal 40. An IRQ is defined as a hardware line over which devices can send interrupt signals to a central processing unit (CPU) 52.

IRQ signal 42 is coupled to an input of an interrupt controller 44. Interrupt controller 44 also has other interrupt sources 46 coupled to its inputs. Interrupt controller 44 is also coupled to system bus 31. Interrupt controller 44 manages IRQ 42 and other interrupt sources 46 and generates an interrupt output signal 50 which is coupled to CPU 52.

SMI signal 48 is coupled directly to an SMI input on CPU 52. When SMI signal 48 is asserted, CPU 52 switches into system management mode (SMM). The SMM found within CPU 52 provides very high level functions, such as power management and security, in a manner that is transparent not only to application software, but also to operating system software. In the Intel ix86 implementation of the system management mode, SMM is one of the major operating modes within CPU 52, on a level with protected mode, real-address mode, or virtual-86 mode. CPU 52 is also coupled to system bus 31 to enable communication with other major operating components within server computer 20.

System management mode of CPU 52 utilizes an SMI handler routine 56 to process SMI console redirection requests received from remote console 10 and return console redirection results to the remote console. SMI handler routine 56 resides within a ROM 53, which is coupled to system bus 31. CPU 52 communicates with SMI handler routine 56 via system bus 31.

ROM 53 also stores a basic input/output system (BIOS) 54 for the computer system. BIOS 54 contains all the code required to control a keyboard, a display screen, disk drives, serial communication, and a number of miscellaneous functions within server computer 20. Storing BIOS 54 in ROM 53 ensures that the BIOS is always be available and is isolated from hard disk drive failures. Server computer 20 can employ BIOS 54 to boot itself. CPU 52 communicates with BIOS 54 via system bus 31.

Server computer 20 also includes a non-volatile random access memory (NVRAM) 57 which stores an authorization password for enabling access to the BIOS-based console redirection feature. A password entered at remote console 10 is passed to computer system 20, then the entered password is validated against the authorization password stored in NVRAM 57 by the SMI handler routine 56 prior to processing the console redirection request.

Figure 3:
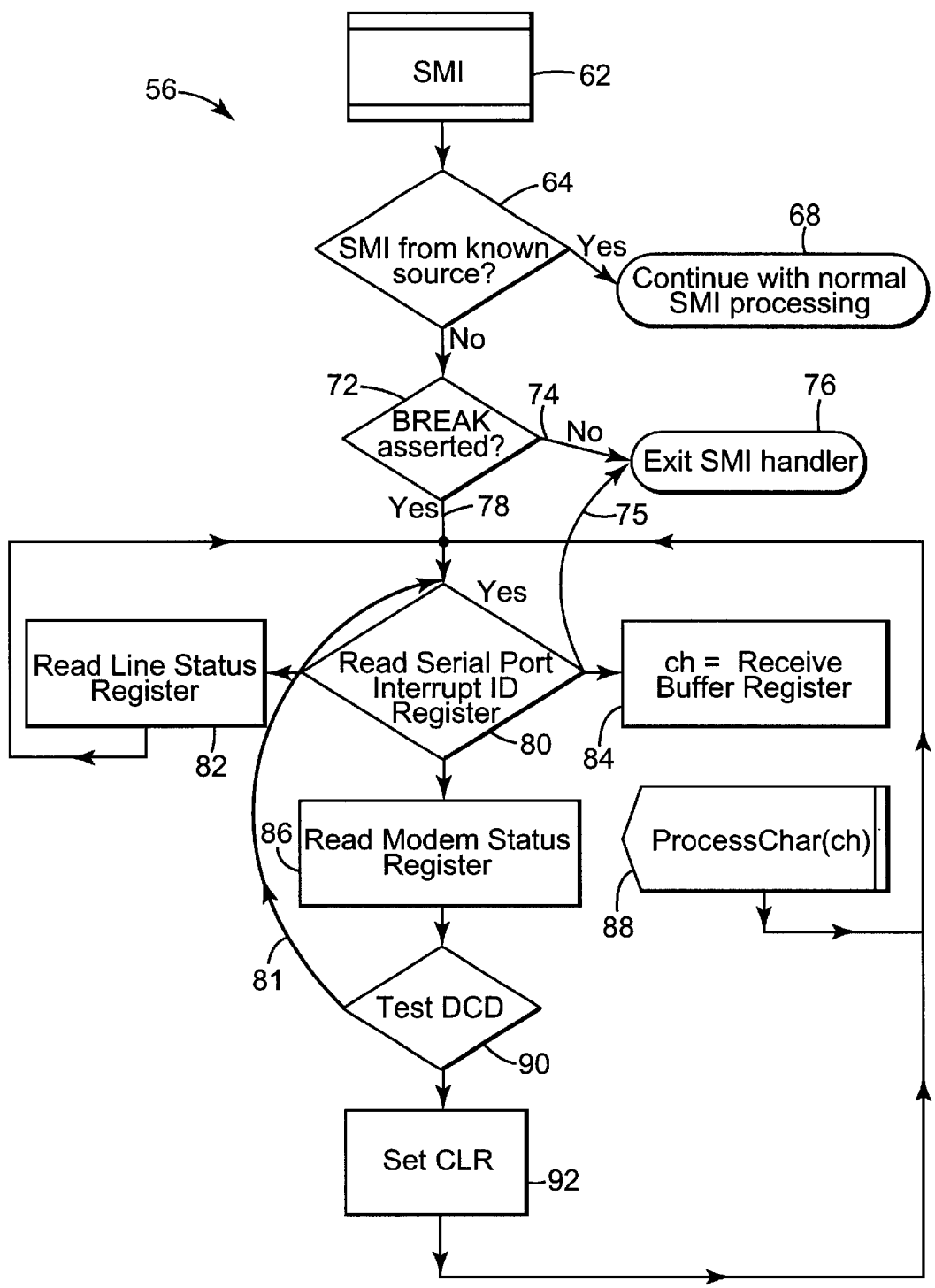
FIG. 3 is a flow diagram which illustrates the processing of a remotely initiated serial break and console redirection request on the server computer of FIG. 2 in accordance with the present invention.

FIG. 3 is a flow diagram which illustrates the processing of a remotely initiated serial break and console redirection request by the SMI handler routine 56 on server computer 20 of FIG. 2 in accordance with the present invention. At block 62, SMI handler routine 56 begins by receiving an SMI signal. At decision block 64, SMI handler routine 56 determines whether the SMI signal is from a known source. If the SMI signal is from known source, flow passes to block 68 where SMI handler routine 56 proceeds with normal SMI processing. If the SMI signal is not from a known source, flow passes to decision block 72 where SMI handler routine 56 checks if a serial break has been asserted. SMI handler routine 56 checks for an asserted serial break by checking break bit 34 of register 32. If a serial break is not asserted, flow passes to block 76 where SMI handler routine 56 is exited. If break bit 34 of register 32 is not set, the SMI signal is identified as a serial break, and processing continues along path 78.

At block 80, after SMI handler routine 56 establishes that the SMI signal has been generated by a serial break, SMI handler routine 56 reads a serial port interrupt ID register in order to determine what caused the serial break (i.e., interrupt). Registers, such as the serial port interrupt ID register, referrred to in the flow diagram of FIG. 3, are implemented in registers 51 of UART 29 of server computer 20. If it is determined that there is no interrupt after reading the serial port interrupt ID register, flow passes to block 76 via path 75 where the SMI handler routine 56 is exited.

If the serial break is determined to be caused by a change in a line status register, flow passes to block 82 wherein the line status register is read. After the line status register is read, the serial break is cleared, and control returns to block 80.

If the serial break is caused by a change in a modem status register, flow passes to block 86, where the modem status register is read. At block 80, after the modem status register is read, the SMI handler routine tests a data carrier detect (DCD) to determine if the modem connection was dropped between remote console 10 and server computer 20. If it is determined that the modem connection was dropped, flow passes to block 92 where the serial break interrupt is cleared by setting the clear bit 36 of register 32, and control returns to block 80. If it is determined that the modem connection was not dropped, control is passed back to block 80 without clearing the serial break via path 81.

If the serial break is caused by the receive buffer register being full, flow passes to block 84 where the receive buffer register is read. The receive buffer register stores character data sent from remote console 10 to server computer 20. After the receive buffer register is read, the SMI handler routine calls a ProcessChar routine 88 to process the character data sent from remote console 10. ProcessChar routine 88 is more fully described in FIG. 4. After the ProcessChar routine 88 has finished processing the character data, control is returned to block 80.

Figure 4:
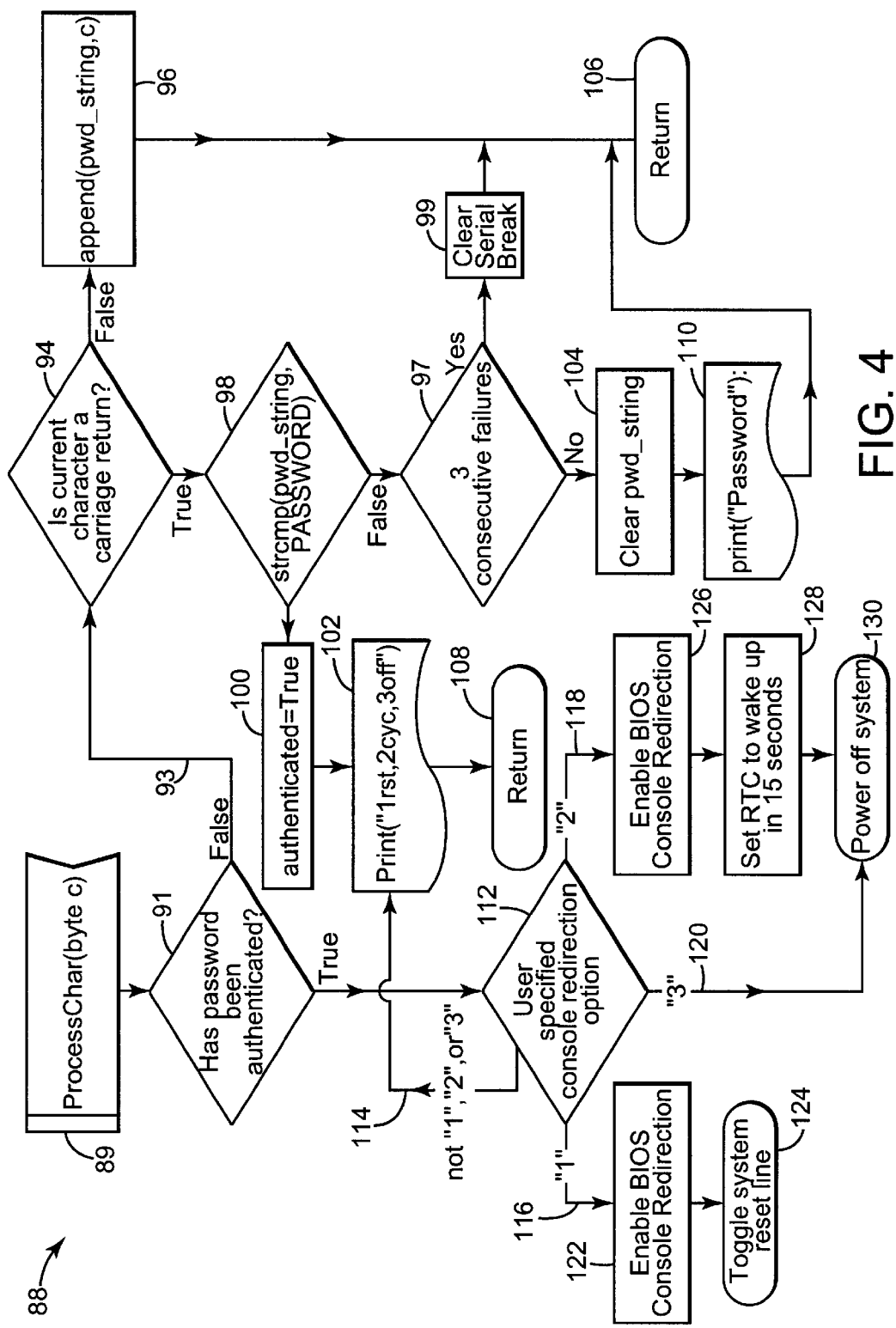
FIG. 4 is a flow diagram which further illustrates a routine of the flow diagram of FIG. 3 for processing character data sent from the remote console.

FIG. 4 is a flow diagram which further illustrates the ProcessChar routine 88 contained within SMI handler routine 56 illustrated in FIG. 3. ProcessChar routine 88 processes character data passed from remote console 10 to server computer 20 via the receive buffer register. ProcessChar routine 88 begins at block 89. At block 91, ProcessChar routine 88 checks to see if an authentication password has been successfully entered from remote console 10 by checking an authentication Boolean variable. If the authentication password has not been successfully entered from remote console 10, control is passed to decision block 94 via path 93.

At decision block 94, ProcessChar routine 88 next checks to see if a carriage return (i.e., character code 0Dh) character has been entered. In order to begin the password authentication, it is necessary for a user at remote console 10 to enter a carriage return. At block 96, if a carriage return is not present, the current character is appended to a current password string (i.e., pwd_string), and at block 106, the ProcessChar routine 88 is exited.

If a carriage return character has been entered, flow is passed back to block 98 where the current password string (i.e., pwd_string) is compared against the authentication password stored in NVRAM 57. At decision block 97, if the current password string does not match the authentication password stored in NVRAM 57, and there have been three consecutive password authentication failures, flow passes to block 99 where SMI handler routine 88 deactivates the break detect signal by setting the clear bit 36 of the register 32. At block 106, after SMI handler routine 88 deactivates the break detect signal, the ProcessChar routine is exited.

If there have not been three consecutive password authentication failures, as tested at block 97, flow passes to block 104 where the current password string is cleared. At block 110, after the current password string is cleared, a prompt (e.g., Password:) is passed back to remote console 10. At block 106, after the password prompt is passed back to the remote console, ProcessChar routine 88 is exited.

At block 100, if the current password string matches the authentication password stored in NVRAM 57, the authentication Boolean variable is set to "True". At block 102, a prompt showing the console redirection options available to the user (e.g., "1rst,2cyc, 3off:") is then sent to remote console 10. This prompt indicates that if a user enters a "1" at the prompt on remote console 10, server computer 20 will be reset and BIOS console redirection will be enabled. If a user enters "2" at the prompt on remote console 10, the server computer 20 will be power cycled, and BIOS console redirection will be enabled. If a user enters a "3" at the prompt on remote console 10, server computer 20 will be powered off. After the prompt is sent to remote console 10, ProcessChar routine 88 is exited.

If the password authentication Boolean variable is already set to "TRUE" upon entry to ProcessChar routine 88, control passes to block 112, where the user response to the prompt showing the console redirection options is processed. If the user response to the console redirection prompt is "1", flow passes to block 122 where BIOS console redirection is enabled. At block 124, after BIOS console redirection is enabled, the system reset line will be toggled. If the user response to the console redirection prompt is "2", BIOS console redirection is enabled, as illustrated at block 126, and flow passes to block 126, where the real time clock (RTC) of server computer 20 is set to wake up in 15 seconds. At block 130, after setting the RTC, the server computer 20 is powered off. At block 130, if the user response to the console redirection prompt is "3", server computer 20 is powered off.

The present invention offers the advantage of a low-cost apparatus and method for remotely initiating BIOS console redirection on server computer 20. Unlike more expensive prior art systems, the present invention does not require a relatively expensive, dedicated microcontroller to manage the redirection. Instead, the present invention utilizes a simple break detect circuit 30, the system management mode of CPU 52, and system management interrupt handler 56 to accomplish the BIOS console redirection. Also, unlike prior art systems, the present invention allows remote initiation of the BIOS console redirection on server computer 20.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the electrical and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A computer system communicating with a remote console via an asynchronous connection, wherein the remote console generates a serial break on the asynchronous connection, the computer system comprising:
    a register having a first bit and a second bit;
    a break detect circuit coupled to the register for detecting the serial break generated by the remote console, and activating a break detect signal in response to the detection, wherein the first bit of the register is set in response to activation of the break detect signal, and wherein the break detect signal is de-activated in response to the second bit of the register being set;
    a system management interrupt (SMI) circuit for asserting an SMI signal upon detection of the break detect signal;
    a memory for storing a basic input output system (BIOS) and an SMI handler routine for handling console redirection requests; and
    a central processing unit (CPU) coupled to the SMI circuit, the register and the memory, wherein the CPU is responsive to the SMI signal being asserted by the SMI circuit, identifies the SMI signal assertion as a remote break by reading the first bit of the register, processes a subsequent console redirection request generated by the remote console by calling the BIOS and the SMI handler routine, and sets the second bit of the register upon completion of the processing of the redirection request.

2. The computer system of claim 1, wherein the computer system further includes a serial port coupled to the asynchronous connection.

3. The computer system of claim 2, wherein the serial port comprises an RS-232serial port.

4. The computer system of claim 2, wherein the computer system farther includes a modem coupled to the serial port.

5. The computer system of claim 4, wherein the computer system firther includes a software application which is configured to answer an incoming call from the remote console via the modem.

6. The computer system of claim 4, wherein the software application is Windows NT Remote Access Server (RAS), available commercially from Microsoft Corporation.

7. The computer system of claim 4, wherein the software application is PC-Anywhere 32, available commercially from Symantec Corporation.

8. The computer system of claim 3, wherein the modem is set to an auto-answer mode.

9. The computer system of claim 2, wherein the computer system further includes a universal asynchronous receiver-transmitter (UART) coupled to the serial port which manages the serial port and handles communications across the asynchronous connection.

10. The computer system of claim 2, wherein the SMI circuit comprises a multiplexer, and wherein the output of the multiplexer switches from an IRQ signal to the SMI signal upon detection of the break detect signal.

11. The computer system of claim 1, wherein the computer system includes a CMOS memory chip having an authorization password for controlling remote access to the BIOS of the computer system from the remote console.

12. The computer system of claim 11, wherein a password entered at the remote console is passed to the computer system, and wherein the entered password is validated against the authorization password prior to processing the console redirection request.

13. A method for enabling remote initiation of basic input output system (BIOS) console redirection on a computer system via an asynchronous connection, the method comprising:
    generating a serial break on the asynchronous connection of the computer system;
    detecting and processing the serial break, wherein a central processing unit is placed in system management mode (SMM) upon detection of the serial break;
    generating a console redirection request on the asynchronous connection of the computer system;
    processing the console redirection request at the CPU, wherein the SMM of the CPU calls the BIOS and an SMI handler routine to service the console redirection request; and
    clearing the serial break upon the completion of processing of the console redirection request.

14. The method of claim 13, wherein the processing of the console redirection request at the CPU further comprises the steps of:
    transmitting a carriage return from the remote console to the CPU, wherein the carriage return generates an SMI password initialization request which is processed by the SMI handler routine.
    sending a password prompt from the SMI handler routine to the remote console;
    transmitting a password from the remote console to the CPU in response to the password prompt; and
    verifying the transmitted password with the SMI handler routine, wherein the SMI handler routine receives each transmitted character of the password and compares the transmitted password with a stored authentication password until a carriage return is received.

15. The method of claim 14, wherein upon three consecutive password verification failures, the SMI handler routine deactivates the break detect signal by setting the second bit of the register.

16. The method of claim 14, wherein upon successful verification of the password, the SMI handler routine sends a second prompt to the remote console describing a set of options for console redirection.

17. The method of claim 16, wherein the set of options for console redirection includes a first option to reset the computer system and enable BIOS console redirection.

18. The method of claim 16, wherein the set of options for console redirection includes a second option to power cycle the computer system and enable BIOS console redirection.

19. The method of claim 16, wherein the set of options for console redirection includes a third option to power off the computer system.

20. A method for enabling remote initiation of basic input output system (BIOS) console redirection on a computer system via an asynchronous connection, the method comprising:

generating a serial break on the asynchronous connection;

detecting the serial break via a break detect circuit, wherein the break detect circuit activates a break detect signal in response to the detection;

setting a first bit of a register coupled to the break detect circuit upon activation of the break detect signal;

asserting a system management interrupt (SMI) signal via an SMI circuit upon detection of the break detect signal;

identifying the asserted SMI signal as a remote break at a central processing unit (CPU) by reading the first bit of the register, wherein the CPU is placed in system management mode (SMM);

generating a console redirection request on the asynchronous connection;

processing the console redirection request at the CPU, wherein the CPU calls the BIOS and an SMI handler routine to service the console redirection request; and clearing the serial break upon the completion of processing of the console redirection request by setting a second bit of the register.

21. The method of claim 20, wherein the processing of the console redirection request at the CPU further comprises the steps of:

transmitting a carriage return from the remote console to the CPU, wherein the carriage return generates an SMI password initialization request which is processed by the SMI handler routine.

sending a password prompt from the SMI handler routine to the remote console;

transmitting a password from the remote console to the CPU; and verifying the transmitted password with the SMI handler routine, wherein the SMI handler routine receives the transmitted password and compares the transmitted password with a stored authentication password.

22. The method of claim 21, wherein upon three consecutive password verification failures, the SMI handler routine deactivates the break detect signal by setting the second bit of the register.

23. The method of claim 21, wherein upon successful verification of the password, the SMI handler routine send a second prompt to the remote console describing a set of options for console redirection.

24. The method of claim 23, wherein the set of options for console redirection includes a first option to reset the computer system and enable BIOS console redirection.

25. The method of claim 23, wherein the set of options for console redirection includes a second option to power cycle the computer system and enable BIOS console redirection.

26. The method of claim 23, wherein the set of options for console redirection includes a third option to power off the computer system.

* * * * *